US012233447B2

(12) United States Patent
Cunningham et al.

(10) Patent No.: US 12,233,447 B2
(45) Date of Patent: Feb. 25, 2025

(54) HYBRID FIXTURE ASSEMBLIES WITH ADDITIVE MANUFACTURED FEATURES INTEGRATED WITH MACHINED METAL FEATURES

(71) Applicant: GM GLOBAL TECHNOLOGY OPERATIONS LLC, Detroit, MI (US)

(72) Inventors: Andrew Thomas Cunningham, Royal Oak, MI (US); Ali Shabbir, Sterling Heights, MI (US); Hassan Ajami, Chandler, AZ (US); Ibrahim El Khatib, Chandler, AZ (US)

(73) Assignee: GM Global Technology Operations LLC, Detroit, MI (US)

( * ) Notice: Subject to any disclaimer, the term of this patent is extended or adjusted under 35 U.S.C. 154(b) by 351 days.

(21) Appl. No.: 17/969,808

(22) Filed: Oct. 20, 2022

(65) Prior Publication Data
US 2024/0131570 A1 Apr. 25, 2024
US 2024/0226986 A9 Jul. 11, 2024

(51) Int. Cl.
| | | |
|---|---|---|
| *B23P 19/04* | (2006.01) | |
| *B21D 37/04* | (2006.01) | |
| *B21D 37/14* | (2006.01) | |
| *B25B 11/00* | (2006.01) | |
| *B33Y 80/00* | (2015.01) | |

(52) U.S. Cl.
CPC ............. *B21D 37/04* (2013.01); *B21D 37/14* (2013.01); *B23P 19/04* (2013.01); *B25B 11/00* (2013.01); *B33Y 80/00* (2014.12)

(58) Field of Classification Search
CPC .......... B21D 37/04; B21D 37/14; B23P 19/04
See application file for complete search history.

(56) References Cited

U.S. PATENT DOCUMENTS

| | | | |
|---|---|---|---|
| 6,276,963 B1 * | 8/2001 | Avery ................. | H01R 13/518 |
| | | | 439/541.5 |
| 9,447,840 B2 | 9/2016 | Morris et al. | |
| 9,618,026 B2 | 4/2017 | Morris et al. | |
| 9,812,684 B2 | 11/2017 | Smith et al. | |
| 11,421,310 B2 | 8/2022 | Bobel et al. | |
| 2021/0213706 A1 | 7/2021 | Bihamta et al. | |
| 2021/0308759 A1 | 10/2021 | Smith et al. | |

* cited by examiner

*Primary Examiner* — Jason L Vaughan
*Assistant Examiner* — Amanda Kreiling
(74) *Attorney, Agent, or Firm* — Quinn IP Law

(57) ABSTRACT

Presented are hybrid fixture assemblies with integrated additive manufactured features, methods for making/using such fixtures, and manufacturing systems equipped with such fixtures. A manufacturing fixture assembly includes a fixture support frame formed, at least in part, from a first material, and a fixture support shell formed, at least in part, from a second material distinct from the first material. The support frame, which seats on/mounts to a work surface, includes a skeletal substructure with multiple male connectors projecting therefrom. The skeletal substructure contains multiple first frame walls that are removably intermeshed with multiple second frame walls in a collapsible format. The support shell includes a support surface that holds a workpiece, an interface surface that abuts the skeletal substructure, and multiple female connectors that project from the interface surface. Each female connector removably receives therein a respective male connector to thereby detachably mount the support shell to the support frame.

20 Claims, 3 Drawing Sheets

HYBRID FIXTURE ASSEMBLIES WITH ADDITIVE MANUFACTURED FEATURES INTEGRATED WITH MACHINED METAL FEATURES

INTRODUCTION

The present disclosure relates generally to manufacturing fixtures. More specifically, aspects of this disclosure relate to multipiece, multi-material manufacturing fixture assemblies for sheet metal stamping processes.

A fixture is a type of production tool used in many industries for locating and retaining a workpiece during a manufacturing process. Fixtures are secure mounting devices that help to accurately position and orient a workpiece to ensure that all resultant parts of the manufacturing process meet desired engineering tolerances and levels of uniformity. Ubiquitous to the automated manufacturing industry, fixtures are frequently used during milling, turning, tapping, welding, forming, and other industrial operations to mass produce a myriad of different products and parts. In sheet metal stamping and prototyping, for example, a die fixture may be used to form and concurrently gauge a sheet metal blank being shaped into a desired component, such as a body panel of an automobile. Traditional techniques for fabricating these workpiece-holding fixtures often require precision machining them from metal billets or assembling them with bolted or welded metal tubing. These are very costly and time-consuming processes, and the resultant fixture is typically a single-use tool that is very cumbersome and difficult to transport.

Additive manufacturing refers to computer-aided fabrication processes for creating multidimensional objects from a digital model by sequentially depositing material, typically layer by layer, within a confined work envelope. One of the biggest advantages of additive manufacturing (AM)—more commonly known as "3-D printing"—is the ability to use a single "printing" tool to produce objects in countless shapes and sizes, including those with complex geometries and internal void spaces, without the attendant material waste, design limitations, and retooling costs associated with traditional manufacturing processes. Various additive manufacturing processes are known, differing primarily in the materials being used and in the way that material is deposited. For instance, AM processes may use an assortment of starting materials, such as thermoplastic filaments, metal powders, polymer blends, resins, and concrete, and may employ various printing processes, such as fused deposition modeling, laser sintering, electron beam melting, and inkjet 3D printing.

SUMMARY

Presented herein are hybrid fixture assemblies with integrated additive manufactured features, methods for making and methods for using such fixtures, computer readable media (CRM) for fabricating such fixtures, and automated manufacturing systems equipped with such fixtures. In an example, there are presented multi-component, multi-material "hybrid" fixtures that integrate AM features with machined metal features for measuring and inspecting sheet metal stampings. Specifically, a hybrid fixture assembly combines a 3D-printed polymeric shell with a computer numerical control (CNC) cut sheet metal support frame. The fixture's support frame may be typified by an egg-crate design with a square-tubed base that buttresses a series of mutually parallel, transverse "cross-base" walls with slots that slidably receive a series of mutually parallel, longitudinal "fore-aft" walls. Once mated and affixed to the support frame, the cross-base and fore-aft frame walls cooperatively define a multidimensional skeletal substructure that supports thereon an AM-produced fixture shell or "skin". Functioning as a workpiece support surface, the fixture shell is integrally formed with elastically deformable "female" connector junctions. These connector junctions receive therein and fixedly attach to complementary "male" connector blades that project from the frame walls. The AM connector junctions exploit elastic averaging principles for improved dimensional accuracy by averaging individual alignment errors over a large number of relatively compliant connector members.

Attendant benefits for at least some of the disclosed concepts include hybrid fixture designs that combine attributes of AM (e.g., complex contours, fine details, reduced waste, etc.) with attributes of CNC fabrication (e.g., high build rates, dimensional accuracy, etc.). Doing so enables the rapid production of a robust and dimensionally accurate fixture support frame, which securely supports a low-cost, feature-rich AM skin. For example, some disclosed fixture designs help to reduce fixture production lead times by up to 95% while decreasing fixture production costs by up to 65%. Disclosed fixture assemblies may employ a universal support frame design that interfaces with various interchangeable skins such that the fixtures are readily scalable and adaptable for different applications. Other attendant benefits may include fixture assembly support frames with an egg-crate design that enables assembly of the fixture without welding and adhesives; doing so enables rapid assembly/disassembly and simplified packaging for shipment/storage of the assembly.

Aspects of this disclosure are directed to hybrid fixture assemblies with additive manufactured (AM) components that are integrated with subtractive manufactured (SM) components. In an example, a fixture assembly is presented for holding a workpiece (e.g., a sheet metal blank or stamped sheet part) during or after a manufacturing process (e.g., sheet metal stamping). This fixture assembly includes, for example, a fixture support frame that is formed, in whole or in part, with one material (e.g., laser-cut aluminum or steel sheet stock), and a fixture support shell that is formed, in whole or in part, from another material distinct from the support frame material (e.g., ABS or PA-based 3D printer filament). The fixture support frame, which seats on and/or mounts to a work surface, includes a skeletal substructure with multiple male connectors projecting (e.g., vertically upward) from the substructure. The skeletal substructure is defined by one set of (first) frame walls that is removably intermeshed with another set of (second) frame walls (e.g., in a collapse-and-stack format). The fixture support shell includes a support surface that holds a workpiece, an interface surface that is opposite the support surface and abuts the support frame's skeletal substructure, and multiple female connectors that project (e.g., vertically downward) from the interface surface. Each female connector removably receives therein a respective one of the male connectors to thereby detachably mount the fixture support shell onto the fixture support frame.

Aspects of this disclosure are also directed to manufacturing workflow processes, system control logic, and computer-readable media (CRM) for making and/or using any of the disclosed fixture assemblies. In an example, a method is presented for manufacturing a fixture assembly for holding a workpiece on a work surface. This representative method includes, in any order and in any combination with any of the above and below disclosed options and features: forming, e.g., with a distinct (first) material using a SM (first) process, a fixture support frame that seats on and/or mounts to a work surface, the fixture support frame including at least two sets of interconnectable (first and second) frame walls; removably intermeshing the two sets of frame walls, e.g., in a crisscross "egg crate" format, to define a skeletal substructure, the fixture support frame further including multiple male connectors projecting from the skeletal substructure; forming, e.g., with another (second) material using another AM (second) process distinct from the support frame material/process, a fixture support shell with a support surface that holds a workpiece, an interface surface opposite the support surface, and multiple female connectors that project from the interface surface; seating the interface surface of the support shell on the skeletal substructure of the support frame; and removably inserting each of the male connectors into a respective one of female connectors to thereby detachably mount the fixture support shell to the fixture support frame.

For any of the disclosed systems, methods, and fixtures, the material of the support frame may include one or more metallic materials, whereas the material of the support shell may include one or more polymeric materials. Furthermore, each male connector may slidably insert into and interference fit with a respective female connector thereby causing elastic deformation at an interface between the mating male and female connectors, e.g., creating an elastic averaging alignment interface across the collective of male/female connectors. For example, each female connector may define an elongated internal channel that slidably receives therein a respective male connector. A series of deformable ribs projects into this internal channel and interference fits with the mating male connector. The female connector ribs may include one set of (first) ribs that projects transversely inward from an inner surface of one (first) sidewall of the cavity, and another set of (second) ribs that projects transversely inward from an inner surface of another (second) sidewall of the cavity. These ribs may be substantially mutually parallel, may be spaced around an inner periphery of the internal channel, and may extend rectilinearly along a length of the internal channel. The entire female connector may elastically deform to achieve the aforementioned elastic averaging functionality.

For any of the disclosed systems, methods, and fixtures, a female connector may include a pair of snap-fastener tabs, each of which is cantilevered to an opposing sidewall or end wall of the female connector's internal cavity and snap-fits to a complementary shoulder of the mating male connector. As another option, a female connector may include a pair of pin holes that extends through opposing sidewalls of the female connector; these pin holes receive a connector pin to thereby mechanically connect the female connector to its mating male connector. In some configurations, a female connector may include both the pin holes and snap-fastener tabs. It may be desirable that the fixture support shell, including the various female connectors, be formed from one or more polymeric materials using an AM process as a single-piece or bipartite structure.

For any of the disclosed systems, methods, and fixtures, one set of frame walls is substantially parallel with and spaced from each other along a width of the fixture's support frame, whereas the other set of frame walls is substantially parallel with and spaced from each other along a length of the support frame. It may be desirable that one set of frame walls be crisscrossed with and substantially orthogonal to the other set of frame walls. Each frame wall may be formed (e.g., stamped or laser cut) from a metallic material (e.g., aluminum or steel) as a single-piece panel. In this regard, some or all of the frame walls in the one set of frame walls may be substantially identical to each other, whereas some or all of the frame walls in the other set may be substantially identical to each other yet distinct from all of the frame walls in the mating set. It is also envisioned that each set of frame walls includes a distinct variety of frame walls. As another option, each of the male connectors is a connector blade that is integrally formed with and projects from one of the single-piece panels of the first and/or second frame walls.

For any of the disclosed systems, methods, and fixtures, each wall in one frame wall set may include a (first) series of slots, with each slot slidably receiving therein one of the frame walls from the other (second) set. Likewise, each wall in the other frame wall set may include a (second) series of slots, with each slot slidably receiving therein one of the frame walls from the mating (first) set. The slots may extend rectilinearly across some, but not all, of each frame wall. It is also envisioned that each frame wall may include slots of different sizes/lengths to receive frame walls of different widths/heights. The support frame may also include a frame base that releasably mounts thereon the frame wall sets. The frame base may be formed from a pair of longitudinally oriented square or rectangular tube beams that fixedly attach to a pair of laterally oriented square/rectangular beams.

The above Summary does not represent every embodiment or every aspect of the present disclosure. Rather, the foregoing summary merely provides a synopsis of some of the novel concepts and features set forth herein. The above features and advantages, and other features and attendant advantages of this disclosure, will be readily apparent from the following Detailed Description of illustrated examples and representative modes for carrying out the disclosure when taken in connection with the accompanying drawings and appended claims. Moreover, this disclosure expressly includes any and all combinations and subcombinations of the elements and features presented above and below.

Figure 1:
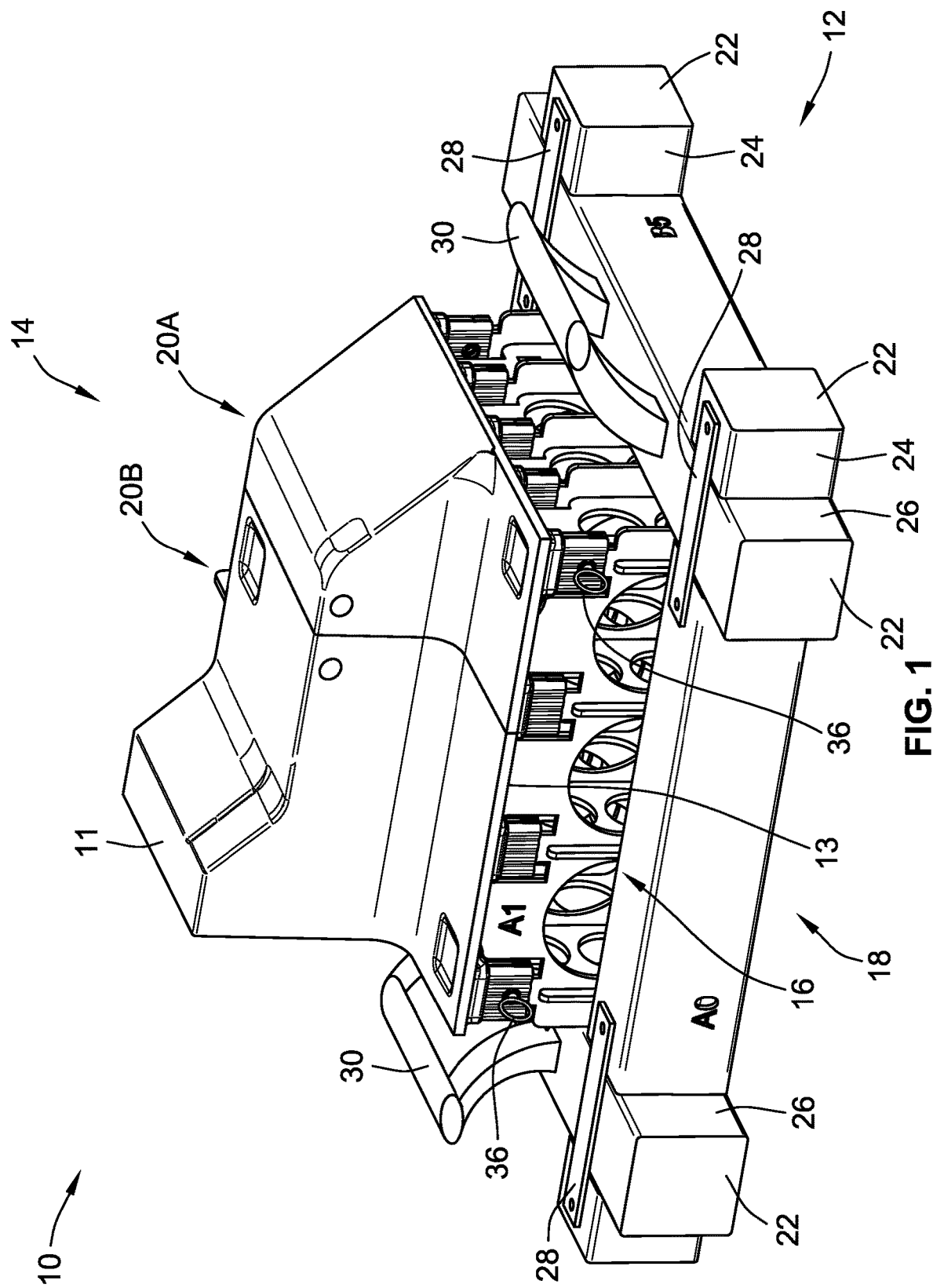
FIG. 1 is an elevated, perspective-view illustration of a representative hybrid fixture assembly with a 3D-printed workpiece support shell mounted onto a machined-metal fixture support frame in accordance with aspects of the present disclosure.

The present disclosure is amenable to various modifications and alternative forms, and some representative embodiments of the disclosure are shown by way of example in the drawings and will be described in detail herein. It should be understood, however, that the novel aspects of this disclosure are not limited to the particular forms illustrated in the above-enumerated drawings. Rather, this disclosure covers all modifications, equivalents, combinations, permutations, groupings, and alternatives falling within the scope of this disclosure as encompassed, for example, by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, lateral, longitudinal, vertical, horizontal, upward, downward, front, back, left, right, etc., may be with respect to a manufacturing fixture when the fixture is operatively oriented on a horizontal work surface.

Discussed below are hybrid fixture assemblies with additive manufactured (AM) features that are integrated with subtractive manufactured (SM) features. Combining attributes of AM processes with attributes of SM processes, for example, enables fabricating assembly components that have complex contours, fine surface details, internal and external void spaces, etc., and are connectable with high-strength, resilient components that are fabricated at high build rates and with increased dimensional accuracy. Disclosed fixture designs may help to reduce fixture production lead times by up to 95% (e.g., 50+day lead time reduced to less than 5 days) while decreasing fixture production costs by up to 80% (e.g., $3000+assembly cost reduced to less than~$600). By employing a universal support frame design that interfaces with a variety of interchangeable skins, disclosed fixture assemblies are readily scalable and adaptable for different applications. In addition, AM connectors may exploit principles of elastic averaging to improve dimensional accuracy for part-to-part alignment by averaging the alignment errors of individual connectors over a large number of relatively compliant connectors (e.g., meet a target ±0.25 mm dimensional alignment tolerance for aligning a die surface to tool ball datums).

For at least some implementations, a hybrid fixture assembly employs a support frame with a sheet-metal "skeletal" substructure that is buttressed on a square or rectangular-tube fixture base and structurally bolsters a workpiece-holding "skin" shell. In a non-limiting example, a manufacturing fixture assembly combines a 3D-printed polymeric shell with a CNC-cut sheet metal support frame, all of which are removably mounted onto a rigid fixture base. The skeletal substructure is assembled from multiple sets of metal frame walls that are intermeshed in a criss-crossed "egg-crate" arrangement that facilitates rapid assembly and disassembly of the fixture while ensuring a complementary interface that seats flush thereon a B-side surface of the fixture shell. With this design, a fixture assembly may be characterized by a lack of adhesives and welding; this, in turn, allows the fixture to be rapidly disassembled and stacked flat for simplified storage, shipping, and reassembly. The skeletal substructure may employ interlocking "blade-like" tab connectors for fixedly securing any one of an assortment of mating support shells to the fixture assembly. With this connector configuration, a part design change may also be accommodated by merely replacing the male connector blades or the frame walls to which they are integrated, rather than replacing the entire fixture tool. These connector blades may enable one-person assembly of the fixture and may provide structural reinforcement for the workpiece-holding fixture shell along its entire length and width.

In addition to using elastic averaging for rapid and precise part-to-part alignment, the male-female connector arrangement may also retain the fixture shell in three dimensions through integrated snap-fit clips and retention pin slots (e.g., that receive cotter clevis, snap, split, etc.). The connectors also help to ensure precise positioning of the fixture shell on a precision manufacturing grid, e.g., even if there are dimensional errors present in the AM part(s). With this connector configuration, a part design change may be accomplished merely by replacing the fixture shell and, thus, need not replace the entire tool assembly. While illustrated and described as a manufacturing fixture for use in sheet metal stamping processes, disclosed fixture assemblies may be employed as a fixture tool for holding a workpiece in an assortment of other manufacturing and non-manufacturing applications. For instance, a disclosed fixture assembly may also be used for positioning two or more adjacent workpieces, e.g., to aid in their joining or assembly. Other options may include employing a disclosed fixture assembly in a polymer mold process, e.g., for composite layups in a fiber-reinforced polymer (FRP) injection molding system. Alternatively, a disclosed fixture assembly may be employed as a dunnage device for shipping parts or may be used as a fixture tool in a vacuum-forming system.

Referring now to the drawings, wherein like reference numbers refer to like features throughout the several views, there is shown in FIG. 1 a representative hybrid fixture assembly, which is designated generally at 10 and portrayed herein for purposes of discussion as a durable and reconfigurable die fixture for sheet metal stamping and prototyping. The illustrated hybrid fixture assembly 10—also referred to herein as "fixture assembly" or "fixture" for short—is merely an exemplary application with which aspects of this disclosure may be practiced. In the same vein, incorporation of the present concepts into manufacturing fixtures should also be appreciated as a non-limiting implementation of disclosed features. As such, it will be understood that aspects and features of this disclosure may be incorporated into any logically relevant type of production process and may be employed for both manufacturing and non-manufacturing applications alike. Moreover, only select components of the hybrid fixture assembly are shown and described in additional detail herein. Nevertheless, the fixture assemblies discussed below may include numerous additional and alternative features, and other available peripheral components, for carrying out the various functions and methods of this disclosure.

Facilitating repeatable precision manufacturing of workpieces into desired parts, the hybrid fixture assembly 10 securely holds and positions a workpiece, including a single or multiple preformed sheet metal blanks or post-processed sheet metal stampings, e.g., for measuring and inspecting the stampings or for allowing a numerically controlled machine tool to form, machine, fuse, etc., material of the workpiece to arrive at its specified part dimensions. In accord with the illustrated architecture, the fixture assembly 10 may be delineated into two primary segments: a rigid, load-bearing fixture support frame 12 and a contoured, workpiece-holding fixture support shell 14. During or after a manufacturing process, for example, the fixture support frame 12 securely seats on and/or rigidly mounts to a work surface, which may be in the nature of a bolster plate on a press bed of a pneumatic or hydraulic press machine. The fixture assembly 10 may operatively attach to a stationary, horizontal work surface (as shown in FIG. 1) or may mount onto a vertical, obliquely oriented, or overhead work surface or, if desired, may mount to a moving work surface, such as a conveyor system, overhead gantry, or robotic end effector. Support shell 14, by comparison, fixedly mounts onto the support frame 12 to provide a workpiece interface for securely supporting, positioning, and/or retaining (collectively "holding") one or more workpieces.

To help reduce assembly build time while maintaining dimensional accuracy and process variation with desired structural stiffness, the fixture support frame 12 may be formed, in whole or in part, from a rigid (first) material using a suitable (first) subtractive manufacturing process. As shown, the fixture support frame 12 may be typified by a skeletal substructure 16 that is formed from interconnected sets of frame walls that are CNC-cut from aluminum sheet metal stock, and a frame base 18 that is formed from interconnected beams sheared from square or rectangular steel tubing by hydraulic pipe shears, cold/band saw tube cutters, or laser cutter. To enable fine surface details and cavities with continuous contours and elastic averaging part-to-part alignment, the fixture support shell 14 may be formed, in whole or in part, from an elastic (second) material using a suitable (second) additive manufacturing process. As shown, the fixture support shell 14 may be typified by one-piece shell body 20 (FIG. 2) or adjoining fore and aft shell units 20A and 20B (FIG. 1), respectively, that are formed from fused filament fabrication (FFF) using a suitable 3D printing filament, such as acrylonitrile butadiene styrene (ABS), polylactic acid (PLA), polyamide (PA), polycarbonate (PC), or polyethylene terephthalate glycol (PETG). While it may be desirable to integrate an AM-fabricated polymer shell with a SM-fabricated metal frame for a select manufacturing process, it should be readily appreciated that alternative AM and SM processes and materials may be employed to fabricate the constituent parts of the fixture assembly for alternative applications.

Figure 2:
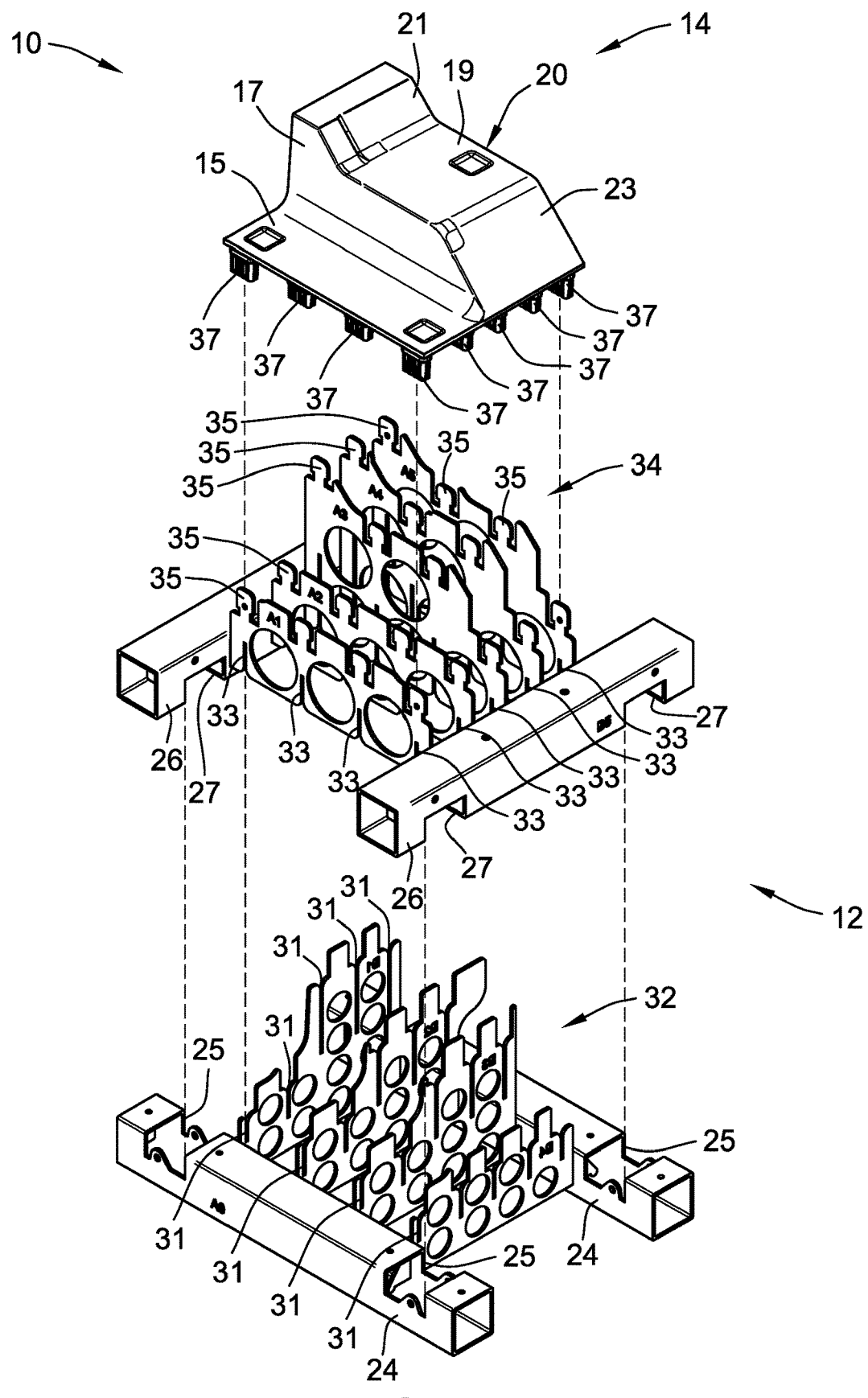
FIG. 2 is a partially exploded, perspective-view illustration of the hybrid fixture assembly of FIG. 1 with the support shell lifted off of the support frame and the support frame bifurcated with the fore-aft frame walls lifted off of the cross-base frame walls.

With collective reference to both FIG. 1 and FIG. 2, the fixture support frame 12 is generally composed of a skeletal substructure 16 that is buttressed on a frame base 18. In the illustrated example, the frame base 18 is fabricated from a pair of elongated side beams 24 that immovably yet releasably attach to a pair of elongated cross beams 26, e.g., to define a rectangular load-bearing framework. The side beams 24 may be structurally identical, substantially mutually parallel, and laterally spaced from each other with respect to the fixture assembly 10. Likewise, the cross beams 26 may be structurally identical, substantially mutually parallel, and longitudinally spaced from each other with respect to the fixture assembly 10. As best seen in FIG. 2, each beam 24, 26 may be a hollow metal tube with a square or rectangular-shaped transverse cross-section and open ends that are optionally sealed off by end caps 22 (FIG. 1). A pair of lap joint grooves 25 and 27 is recessed into a lateral face of each beam 24, 26, respectively, adjacent longitudinal ends thereof. The lap joint grooves 25 of the side beams 24 each nests therein one of the lap joint grooves 27 of one of the cross beams 26 to create a cross lap joint that physically connects the beams 24, 26. A reinforcement plate 28 (FIG. 1) may extend across each cross lap joint and bolt to the side beams 24 to fortify the joint. As yet a further option, a pair of handles 30 (FIG. 1) may be fastened to the cross beams 26 of the frame 12 to facilitate handling of the fixture assembly 10. It should be appreciated that the fixture support frame's base 18 may take on alternative shapes, sizes, materials, and constructions without departing from the intended scope of this disclosure.

The support frame's skeletal substructure 16 releasably mounts onto the frame base 18 and provides subjacent support for the fixture's support shell 14. As noted above, the skeletal substructure 16 may include or otherwise consist essentially of two sets of frame walls 32 and 34 (FIG. 2) that releasably mesh with each other in a crisscross pattern that facilitates rapid assembly and disassembly of the hybrid fixture 10 (e.g., in a collapse-and-stack format). Hooked flanges (not visible in the views provided) projecting from opposing sides of the "cross-base" frame walls 32 insert into complementary slots (also not visible) in lateral faces of the side beams 24. In the same vein, hooked flanges (not visible) projecting from opposing ends of the "fore-aft" frame walls 34 insert into complementary slots (not visible) in lateral faces of the cross beams 26. With this arrangement, the cross-base frame walls 32 may be substantially mutually parallel, extending transversely between the side beams 24 and spaced equidistantly from one another along the length of the support frame 12. By comparison, the fore-aft frame walls 34 may be substantially mutually parallel, extending longitudinally between the cross beams 26 and spaced equidistantly from one another along the width of the support frame 12.

Cross-base frame walls 32 may intersect in a crisscross pattern with and situate substantially orthogonal to the fore-aft frame walls 34, e.g., to define a square lattice framework. To facilitate intermeshing of the frame walls, each of the cross-base frame walls 32 is fabricated with a set of (first) elongated slots 31 that may be substantially parallel to each other and spaced equidistantly across the width of the support frame 12. Similarly, each of the fore-aft frame walls 34 is fabricated with a set of (second) elongated slots 33 that may be substantially parallel to each other and spaced equidistantly across the length of the support frame 12. These slots 31, 33 may extend rectilinearly across a limited portion of each frame wall 32, 34 (e.g., extending vertically across less than half a total wall height in FIG. 2). During assembly and disassembly of the fixture 10, each of the slots 31 slides across a respective opposing slot 33 in order to intermesh/disentangle the frame walls 32, 34. Once intermeshed, each cross-base frame wall slot 31 receives therein one of the fore-aft frame walls 34, whereas each fore-aft frame wall slot 33 receives therein one of the cross-base frame walls 32. It should be appreciated that the fixture support frame's base-to-shell interfacing substructure 16 may take on alternative shapes, sizes, materials, and constructions without departing from the intended scope of this disclosure.

A 3D-printed support shell 14 rests on and covers the skeletal substructure 16 to provide a fixture-to-workpiece interface for holding one or more workpieces. It is envisioned that herein-described fixture support shells may take on innumerable combinations of shapes, sizes, materials, surface features, finishes, AM and SM manufacturing processes, etc. The illustrated support shell 14, for example, includes a contoured upper (A-side) support surface 11 that seats thereon and holds at least one workpiece, and a contoured lower (B-side) interface surface 13 that is opposite the support surface 11 and abuts the upper extent of the skeletal substructure 16. While not per se limited, the upper support surface 11 may be delineated into a horizontal left-side (first) planar surface segment 15, a vertical intermediate (second) planar surface segment 17 adjoining and substantially orthogonal to the left-side surface segment 15, and a horizontal right-side (third) planar surface segment 19, which adjoins and is substantially orthogonal to the intermediate surface segment 17 and vertically spaced from and substantially parallel to the left-side surface segment 15. Upper support surface 11 of FIG. 2 may also include a ramped (fourth) planar surface segment 21 adjoining and projecting obliquely from one edge of the surface segment 19, and another ramped (fifth) planar surface segment 23 adjoining and projecting obliquely from an opposite edge of the surface segment 19. In addition to the complex multi-dimensional layout of the various surface segments, AM processes also enable the fine surface details and irregular features distributed across the support surface 11 of the shell 14, including recessed cavities, filleted corners, beveled edges, raised surface sections, etc.

To help ensure precise alignment between the frame 12 and shell 14 during assembly and use of the fixture 10, the AM support shell 14 incorporates elastically deformable connectors that interface with mating connectors of the SM support frame 12 using principles of elastic averaging. By way of example, and not limitation, some or all of the frame walls 32, 34 attach thereto or are integrally formed with a set of male connectors 35 that project vertically upward from the skeletal substructure 16. In accord with the representative fixture assembly 10, four rigid male connectors 35 with a metallic blade-like tab structure are integrally formed with each of the five (5) fore-aft frame walls 34, spaced equidistantly from each other along the length of the support frame. Juxtaposed in opposing spaced relation to the male connectors 35 in FIG. 2 is a set of elastically deformable female connectors 37 attached to or integrally formed with the fixture support shell 14, projecting vertically downward from the lower interface surface 13. In accord with illustrated architecture, twenty (20) plastic female connector junctions are arranged in a rectangular array and integrally formed with the one-piece shell body 20, with each female connector 37 operatively aligned with a respective one of the male connectors 35. Increasing the number of mating connectors concurrently increases the number deformable mating points which, in turn, helps to "average out" potential alignment errors.

During assembly of the fixture 10, each male connector 35 slidably inserts into and interference fits with a respective female connector 37 to thereby cause elastic deformation at an interface between the mating male and female connectors 35, 37. With reference again to FIG. 2, for example, the fixture support shell 14 may be lowered onto the skeletal substructure 16 of the support frame 12 such that the sheath-like female connectors 37 projecting downward from the interface surface 13 press onto and envelop the pan-head shaped male connectors 35 to thereby detachably mount the shell 14 to the frame 12. Each of the female connectors 37—two examples of which are shown at 37A and 37B in FIGS. 3 and 4—contains an elongated internal channel 41 into which is received a respective male connector 35. Projecting into the internal channel 41 of each female connector 37 are compliant ribs that interference "friction" fit with the male connector 35. As shown, a left-side (first) set of ribs 43A project transversely inward from a respective (first) inner surface of a left (first) sidewall of the female connector 37, whereas a right-side (second) set of ribs 43B project transversely inward from a respective (second) inner surface of a right (second) sidewall of the female connector 37. All of the ribs 37A, 37B may be substantially parallel to one another and may extend rectilinearly along a top-to-bottom length of the internal channel 41.

Figure 4:
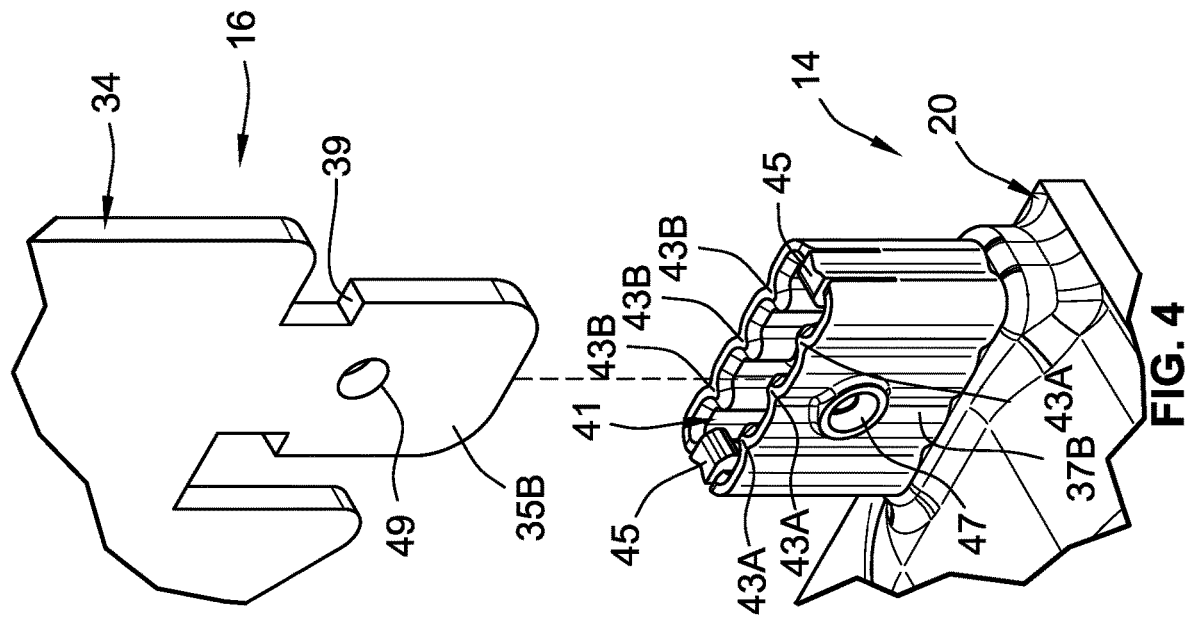
FIG. 4 is a partially exploded, perspective-view illustration of a cotter-type female connector junction that is integral with the fixture support shell and interfaces using elastic averaging with a complementary male junction blade that is integral with the fixture support frame of FIG. 1.
Figure 3:
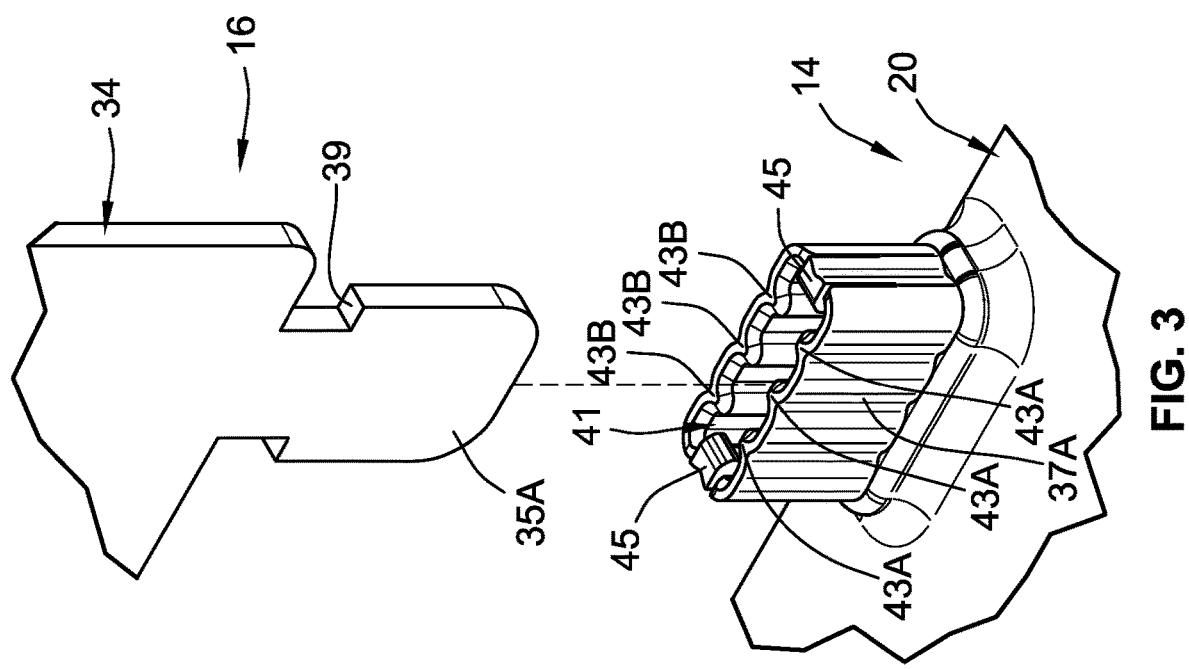
FIG. 3 is a partially exploded, perspective-view illustration of a snap-fit female connector junction that is integral with the fixture support shell and interfaces using elastic averaging with a complementary male connector blade that is integral with the fixture support frame of FIG. 1.

For simplicity of manufacture and design, it may be desirable that all of the male connectors 35 be substantially structurally identical to one another and all of the female connectors 37 be substantially structurally identical to one another. It is also within the scope of this disclosure that one, some, or all of the male and/or female connectors 35, 37 take on alternative shapes, sizes, and features. In FIGS. 3 and 4, for example, the female connectors 37A and 37B are each integrally formed with a pair of flexible snap-fastener tabs 45. Each snap-fastener tab 45 is cantilevered to an opposing end wall of the female connector 37A, 37B and snap-fits to a complementary shoulder 39 of a mating male connector 35A, 35B. By way of contrast, the female connector 37B of FIG. 4 includes a pair of cotter pin holes 47 that extend through opposing sidewalls of the female connector 37B. By inserting the male connector 35B into the female connector 37B, a complementary blade hole 49 in the male connector 35B aligns with the cotter pin holes 47 in the female connector 37B such that a cotter-type connector pin 36 (FIG. 1) is inserted through the aligned holes 47, 49 to thereby mechanically lock the female connector 37B to its mating male connector 35B and, thus, the fixture support frame 12 to the fixture support shell 14. It is within the scope of this disclosure to employ cotter-type connector pins (as shown) as well as other suitable retention pins, such as clevis pins, snap pins, split pins, threaded fasteners, rivets, etc. Another option for mating the male and female connectors includes attaching a coil spring or elastic band from the female connector onto the metal frame.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software, or a combination thereof, in a computer system or other processing system.

Any of the methods described herein may include machine readable instructions for execution by: (a) a processor, (b) a controller, and/or (c) any other suitable processing device. Any algorithm, software, control logic, protocol or method disclosed herein may be embodied as software stored on a tangible medium such as, for example, a flash memory, a solid-state drive (SSD) memory, a hard-disk drive (HDD) memory, a CD-ROM, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms may be described with reference to flowcharts and/or workflow diagrams depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A fixture assembly for holding a workpiece on a work surface, the fixture assembly comprising:
    a fixture support frame formed with a first material and configured to seat on and/or mount to the work surface, the fixture support frame including a skeletal substructure and multiple male connectors projecting from the skeletal substructure, the skeletal substructure defined by multiple first frame walls removably intermeshed with multiple second frame walls; and
    a fixture support shell formed with a second material distinct from the first material, the fixture support shell including a support surface configured to hold the workpiece, an interface surface abutting the skeletal substructure, and multiple female connectors projecting from the interface surface and each removably receiving therein a respective one of the male connectors to thereby detachably mount the fixture support shell to the fixture support frame.

2. The fixture assembly of claim 1, wherein the first material is a metallic material and the second material is a polymeric material, and wherein each of the male connectors slidably inserts into and interference fits with the respective female connector and thereby causes elastic deformation at an interface between the male connector and the respective female connector.

3. The fixture assembly of claim 1, wherein each of the female connectors defines an internal channel slidably receiving therein the respective male connector, each of the female connectors including multiple ribs projecting into the internal channel and interference fitting with the respective male connector.

4. The fixture assembly of claim 3, wherein the ribs include first and second sets of ribs projecting transversely inward from opposing first and second inner surfaces, respectively, of the female connector.

5. The fixture assembly of claim 4, wherein the first and second sets of ribs are substantially mutually parallel and extend longitudinally along a length of the internal channel.

6. The fixture assembly of claim 3, wherein each of the fixture support shell further includes a pair of snap-fastener tabs cantilevered to opposing walls of the female connector and snap-fitting to complementary shoulders of the respective male connector.

7. The fixture assembly of claim 3, wherein each of the female connectors includes a pair of pin holes extending through opposing sidewalls of the female connector and configured to receive a connector pin mechanically connecting the female connector to the respective male connector.

8. The fixture assembly of claim 1, wherein the fixture support shell, including the female connectors, is formed from a polymeric material as a single-piece or bipartite structure.

9. The fixture assembly of claim 1, wherein the first frame walls are substantially parallel with and spaced from each other along a width of the fixture support frame, and wherein the second frame walls are substantially parallel with and spaced from each other along a length of the fixture support frame.

10. The fixture assembly of claim 9, wherein the first frame walls are crisscrossed with and substantially orthogonal to the second frame walls.

11. The fixture assembly of claim 1, wherein each frame wall of the first and second frame walls is formed from a metallic material as a single-piece panel.

12. The fixture assembly of claim 11, wherein each of the male connectors includes a connector blade integrally formed with and projecting from one of the single-piece panels of the first and second frame walls.

13. The fixture assembly of claim 1, wherein each of the first frame walls includes a first series of slots slidably receiving therein one of the second frame walls, and each of the second frame walls includes a second series of slots slidably receiving therein one of the first frame walls.

14. The fixture assembly of claim 1, wherein the fixture support frame further includes a frame base releasably mounting thereon the first and second frame walls.

15. A method of manufacturing a fixture assembly for holding a workpiece on a work surface, the method comprising:
    forming, with a first material, a fixture support frame configured to seat on and/or mount to the work surface, the fixture support frame including multiple first frame walls and multiple second frame walls;
    removably intermeshing the first frame walls with the second frame walls to define a skeletal substructure, the fixture support frame further including multiple male connectors projecting from the skeletal substructure;
    forming, with a second material distinct from the first material, a fixture support shell including a support surface configured to hold the workpiece, an interface surface opposite the support surface, and multiple female connectors projecting from the interface surface;

seating the interface surface of the fixture support shell on the skeletal substructure of the fixture support frame; and removably inserting each of the male connectors into a respective one of female connectors to thereby detachably mount the fixture support shell to the fixture support frame.

16. The method of claim 15, wherein each of the female connectors defines an internal channel slidably receiving therein the respective male connector, each of the female connectors including multiple ribs projecting into the internal channel and interference fitting with the respective male connector.

17. The method of claim 16, wherein each of the female connectors includes:

a pair of snap-fastener tabs cantilevered to opposing walls of the female connector and snap-fitting to complementary shoulders of the respective male connector; or a pair of pin holes extending through opposing sidewalls of the female connector and configured to receive a connector pin mechanically connecting the female connector to the respective male connector.

18. The method of claim 15, wherein the fixture support shell, including the female connectors, is formed via an additive manufacturing process from a polymeric material as a single-piece or bipartite structure.

19. The method of claim 15, wherein the first frame walls are substantially parallel with and spaced from each other along a width of the fixture support frame, and wherein the second frame walls are substantially parallel with and spaced from each other along a length of the fixture support frame.

20. The method of claim 15, wherein each frame wall of the first and second frame walls is formed via a computer-numerical control (CNC) laser cutting process from a metallic material as a single-piece panel.

* * * * *